US007217376B2

(12) United States Patent
Ikarashi

(10) Patent No.: US 7,217,376 B2
(45) Date of Patent: May 15, 2007

(54) SEPARATION WALL TRANSFER MOLD, SEPARATION WALL FORMING METHOD, AND PLASMA DISPLAY PANEL FORMED BY USING THE SAME

(75) Inventor: Yoichi Ikarashi, Tokyo (JP)

(73) Assignee: Pioneer Corporation, Tokyo (JP)

( * ) Notice: Subject to any disclaimer, the term of this patent is extended or adjusted under 35 U.S.C. 154(b) by 307 days.

(21) Appl. No.: 10/896,904

(22) Filed: Jul. 23, 2004

(65) Prior Publication Data

US 2005/0017639 A1 Jan. 27, 2005

(30) Foreign Application Priority Data

Jul. 24, 2003 (JP) ............................ 2003-279379

(51) Int. Cl.
*B29C 43/38* (2006.01)

(52) U.S. Cl. .................... 264/1.21; 264/642; 425/127; 425/128; 425/215; 425/470

(58) Field of Classification Search ................ 425/127, 425/128, 215, 470; 264/1.21, 642
See application file for complete search history.

(56) References Cited

U.S. PATENT DOCUMENTS 2,440,144 A * 4/1948 Hosking .................... 425/128
2,733,494 A * 2/1956 Bryer et al. ................. 425/84
3,502,767 A * 3/1970 Mason et al. ........... 264/297.2
3,676,040 A * 7/1972 McKinney ................. 425/470
3,957,411 A * 5/1976 Schiesser .................... 425/215
5,344,596 A * 9/1994 Hendry ...................... 264/40.3
6,200,121 B1 * 3/2001 Tsuruta ....................... 425/127
6,752,615 B2 * 6/2004 Uotani ....................... 425/215
2003/0090035 A1 * 5/2003 Mori et al. ................ 264/255

FOREIGN PATENT DOCUMENTS

JP 2000-11865 A 1/2000
JP 2002-8524 A 1/2002
JP 2003-123640 4/2003
KR 2002-0072869 9/2002
KR 2003-0017246 3/2003

OTHER PUBLICATIONS

Korean Patent Office Action.

* cited by examiner

*Primary Examiner*—Robert B. Davis
(74) *Attorney, Agent, or Firm*—Sughrue Mion, PLLC

(57) ABSTRACT

A separation wall transfer mold adaptive to form separation walls on a substrate, includes a main body. A separation wall concave section has concaves for separation walls and is formed in a surface of the main body for a material of the separation walls to be spewed into the separation wall concave section when the separation wall transfer mold is pressed to a substrate. A spew preventing concave section is formed in the surface of the main body for an excess portion of the material to be spewed in the spew preventing concave section.

15 Claims, 18 Drawing Sheets

SEPARATION WALL TRANSFER MOLD, SEPARATION WALL FORMING METHOD, AND PLASMA DISPLAY PANEL FORMED BY USING THE SAME

BACKGROUND OF THE INVENTION

1. Field of the Invention

The present invention relates to a separation wall transfer mold, a separation wall forming method, and a plasma display panel formed by using the same.

2. Description of the Related Art

FIG. 1 shows an example of the typical structure of a plasma display panel. Referring to FIG. 1, the plasma display panel is composed of a front substrate 200 and a back substrate 100. The front substrate 200 contains a transparent glass substrate 201, a transparent dielectric layer 202, and a surface protection layer 204. Bus electrodes 205, scan electrodes 206, and sustain electrodes 207 are formed on the transparent glass substrate 201. The back substrate 100 contains a transparent glass substrate 101, and a white dielectric layer 102. Data electrodes 105 are formed on said transparent glass substrate 101, and phosphor layers 105 and separation walls 130 are formed on the white dielectric layer 102. A plurality of discharge spaces are formed by the separation walls 130 when the front substrate 200 and the back substrate 100 are combined. By generating predetermined discharge every discharge space, the phosphor layer 104 emits light and an image is displayed as a whole of the panel. The interference of the discharges and the cross talk between the colors are prevented by the separation walls 130. This discharge space is desirably formed to have a smaller size so that the image can be clearly displayed. Therefore, the separation wall 130 is required to be precisely manufactured. The width of the separation wall is tens of μm, the height thereof is hundreds of μm and the pitch thereof is hundreds of μm.

A method of forming a separation wall through a transfer operation is disclosed in Japanese Laid Open Patent Application (JP-P2000-11865A). In this conventional method, a model mold for separation walls is formed, a concave shape mold is formed by using the model mold as an original mold, and separation wall material is embedded in the concave shape mold. Thus, the separation walls are formed. As another method, a concave shape mold is formed of solid resin or electroforming. The concave shape mold is used as a mold for a press operation. Thus, the separation walls are formed by pressing insulator of separation wall material with the concave shape mold.

Also, Japanese Laid Open Patent Application (JP-P2002-8524A) discloses a method of forming plasma display panel ribs. In this conventional method, first photosensitive paste as one of photosensitive black glass-ceramic paste and photosensitive white glass-ceramic paste is partially embedded in grooves of a forming mold and this paste is hardened by radiation rays. After supplying a second photosensitive paste as the other photosensitive paste onto a glass substrate, the forming mold and the glass substrate are combined through the second paste to form a laminate body. A rib pre-molded body having white and black layers is formed through irradiation of the radiation rays. The forming mold is removed from the glass substrate and the rib pre-molded body, and the rib pre-molded body is transferred onto the glass substrate. The rib pre-molded body is sintered to accomplish ribs attached to the glass substrate as a unitary body.

SUMMARY OF THE INVENTION

An object of the present invention is to provide a separation wall transfer mold, a method of forming separation walls, and a plasma display panel using the same, in which the separation walls can be precisely formed.

Another object of the present invention is to provide a separation wall transfer mold, a method of forming separation walls, and a plasma display panel using the same, in which an excess portion of material of the separation walls does not hinder assemble of the plasma display panel.

In an aspect of the present invention, a separation wall transfer mold adaptive to form separation walls on a substrate, includes a main body. A separation wall concave section has concaves for separation walls and is formed in a surface of the main body for a material of the separation walls to be spewed into the separation wall concave section when the separation wall transfer mold is pressed to a substrate. A spew preventing concave section is formed in the surface of the main body for an excess portion of the material to be spewed in the spew preventing concave section.

Here, the spew preventing concave section may be provided in a peripheral portion of the separation wall concave section. Also, the spew preventing concave section may be provided around the separation wall concave section to surround the separation wall concave section. Also, the spew preventing concave section may be provided partially around the separation wall concave section.

Also, the spew preventing concave section may have a cross section in which a width of the spew preventing concave section becomes narrower in a depth direction of the spew preventing concave section. Also, the spew preventing concave section may have a same pattern as the separation wall concave section. Also, a depth of the spew preventing concave section may be shallower than that of the separation wall concave section.

Also, the material is desirable to be glass paste.

In another aspect of the present invention, a plasma display panel in which a plurality of discharge regions are formed by separation walls, includes a substrate. Separation walls are formed by carrying out a molding of a material of the separation walls in a display region of the substrate. An excess material accommodating section is formed by carrying out the molding of the material in a designed region around the display region.

Here, a height of the excess material accommodating section may be lower than that of the separation walls. Also, a pattern of convex portions of the excess material accommodating section may be same as that of convex portions of the separation walls.

In another aspect of the present invention, a method of forming separation walls in a plasma display panel, is achieved by applying paste material on a substrate; by pressing a separation wall transfer mold to the substrate, such that the paste material is spewed into a separation wall concave section of the separation wall transfer mold and an excess portion of the paste material is spewed in a spew preventing concave section of the separation wall transfer mold; by removing the separation wall transfer mold from the substrate; and by sintering the paste material.

In another aspect of the present invention, a separation wall transfer mold adaptive to form separation walls on a substrate, includes a main body. In a separation wall concave region, first concaves for separation walls are formed on a side of a surface of the main body. In a spew preventing concave section region, second concaves are formed on the side of the surface of the main body. Through a link region, the separation wall concave region and the spew preventing concave section are connected. When the separation wall transfer mold is pressed to a substrate, an excess portion of a material for the separation walls is spewed from the separation wall concave section for the material to the spew preventing concave section through the link region.

Here, the spew preventing concave section may be formed such that the material accommodated in the separation wall concave section does not hinder assembly of the substrate. The spew preventing concave section may be provided partially or fully around the separation wall concave section.

Also, a discharge space may be formed from the separation walls, and a convex portion in the link region may be recessed than a convex portion corresponding to the discharge space in the separation wall concave region. The material is desirable to be glass paste.

In another aspect of the present invention, a method of forming separation walls in a plasma display panel, is achieved by applying paste material on a substrate; by pressing a separation wall transfer mold to the substrate, such that the paste material is spewed into a separation wall concave region and an excess portion of the paste material is spewed in a spew preventing concave region through a link region, the separation wall transfer mold comprising a main body, a separation wall concave region in which first concaves for separation walls are formed on a side of a surface of the main body, a spew preventing concave section region in which second concaves are formed on the side of the surface of the main body, and a link region through which the separation wall concave region and the spew preventing concave section are connected; by removing the separation wall transfer mold from the substrate; and by sintering the paste material.

DESCRIPTION OF THE PREFERRED EMBODIMENTS

Hereinafter, a separation wall transfer method of the present invention will be described in detail with reference to the attached drawings.

A separation wall transfer mold of the present invention is used in a process of forming separation walls on a transparent substrate of a plasma display panel. Glass paste as material for the separation walls is applied on a glass transparent substrate and the separation wall transfer mold which has a concave section for the separation walls is pressed against the glass substrate. At this time, the glass paste is spewed into the concave section for the separation walls and the concave section is filled with the glass paste. Thus, the glass paste is formed to have the shape of the separation walls. Then, the separation wall transfer mold is removed and the glass paste is sintered. In this way, the separation walls are formed.

In the above process, it is necessary that the glass paste is spewed in the concave section without lack. For this purpose, a sufficient amount of the glass paste to form the separation walls is applied on the substrate. An excess portion of the glass paste is sometimes spewed out from a region where the separation walls should be formed when the separation wall transfer mold is pressed against the substrate. When the spewed out excess portion of the glass paste reaches an electrode terminal section, an operation fault of the plasma display panel is caused. When the spewed out excess portion of the glass paste reaches an exhaust hole and another portion, an exhaust fault, a fault of mounting a part to the substrate, and a connection fault are caused. Therefore, it is necessary to remove the excess portion of the glass paste spewed to a region other than designed portions. In this case, a washing process and a smearing process are required, resulting in increase of the number of processes. Moreover, a new problem about dust in the smearing process is caused.

Therefore, a spew preventing concave section is provided in a region of the separation wall transfer model of the present invention. In case of the pressing of the separation wall transfer mold, an excess portion of the glass paste flows into the spew preventing concave section. Thus, it can be prevented that the excess portion of the glass paste spews out to other regions. The glass paste spewed into the spew preventing concave section is sintered together with the glass paste spewed into the separation wall concave section. In this way, the glass paste spewed into the spew preventing concave section does not cause any problem and hinders an assembling process of the plasma display panel.

Figure 1:
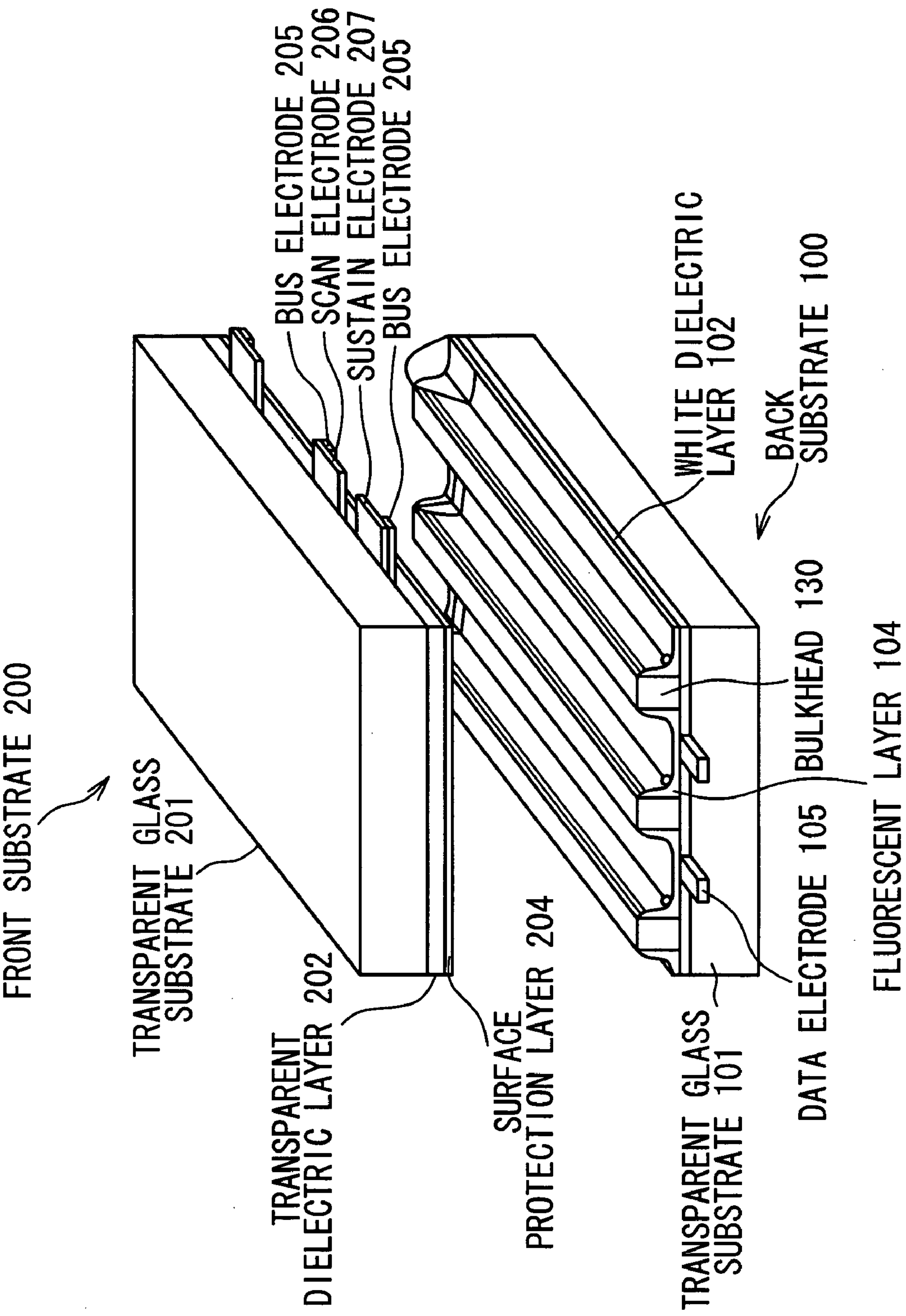
Fig. 1 PRIOR ART
FIG. 1 is a perspective view showing an example of the structure of a conventional plasma display panel.
Figure 2:
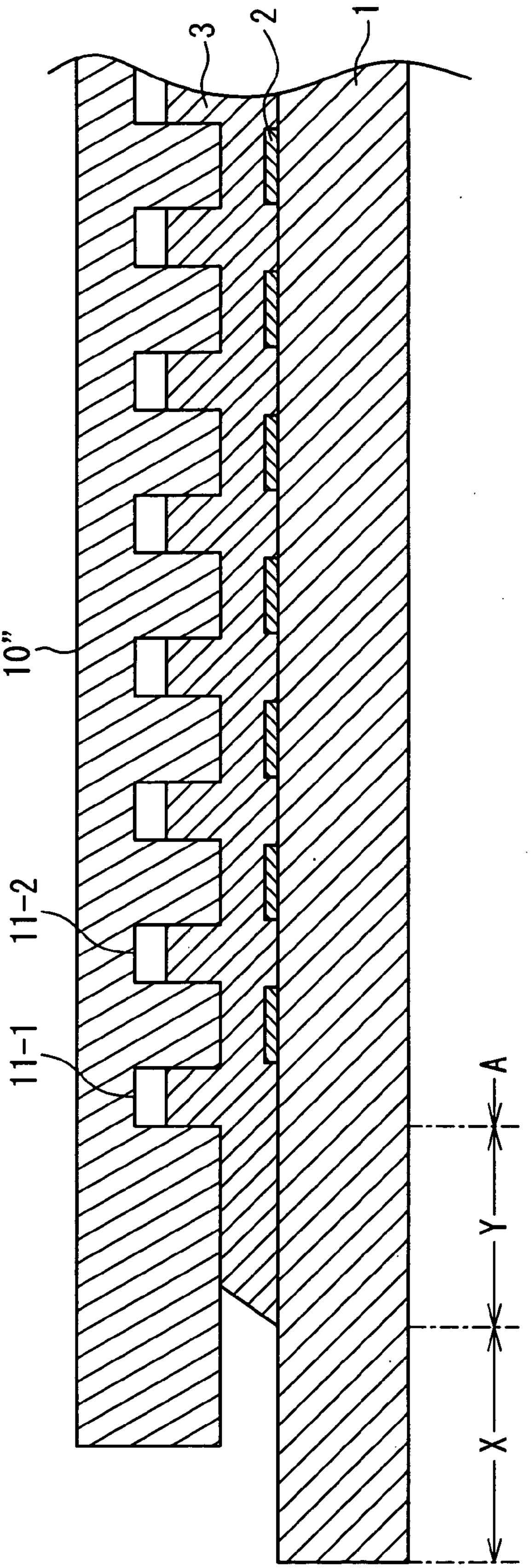
Fig. 2 PRIOR ART
FIG. 2 is a cross sectional view showing a substrate and a conventional separation wall transfer mold in a separation wall forming method when the conventional separation wall transfer mold does not have a spew preventing concave section.
Figure 3:
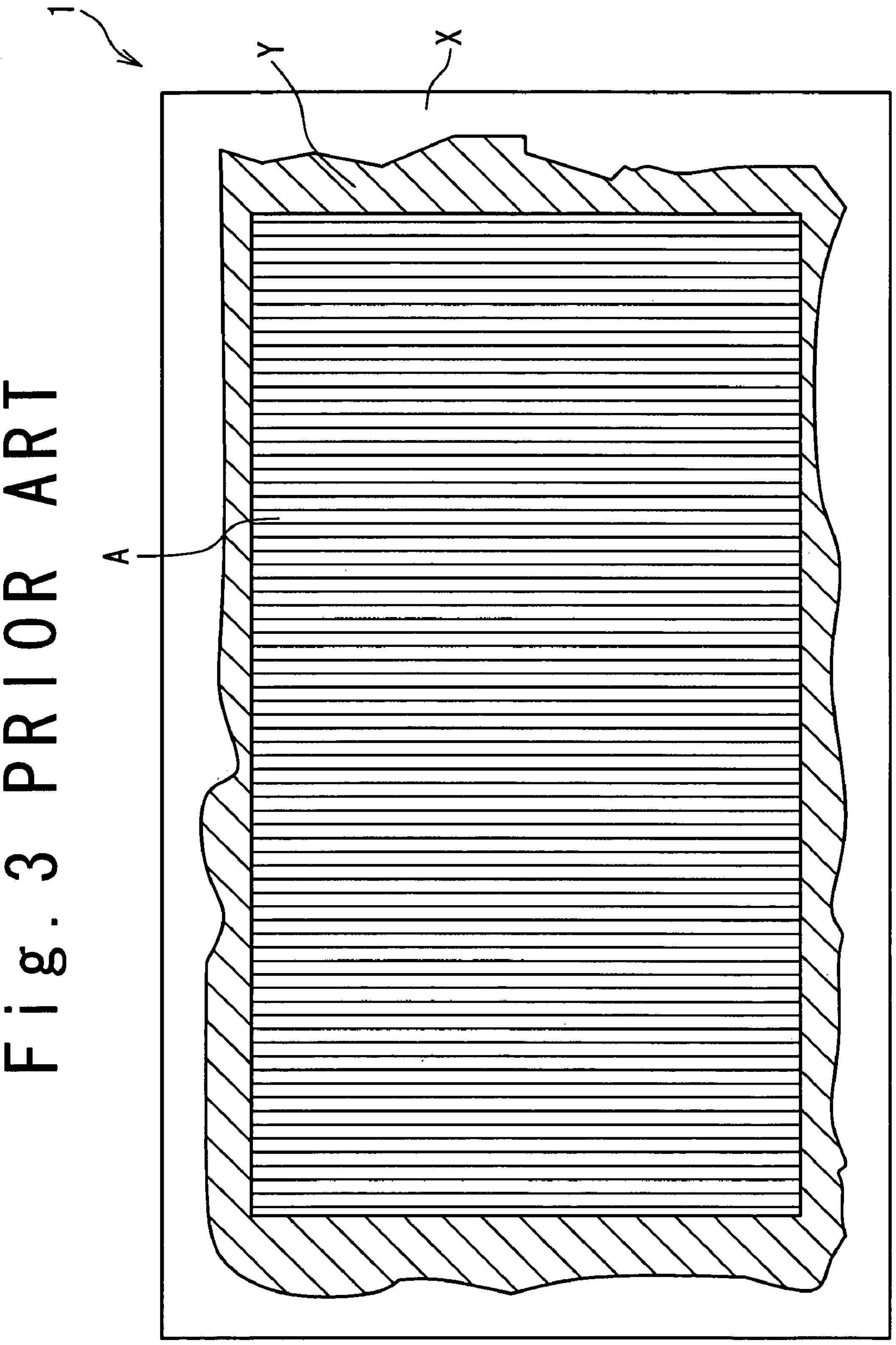
Fig. 3 PRIOR ART
FIG. 3 is a plan view showing a resultant substrate.

FIG. 2 is a cross sectional view showing a substrate and a separation wall transfer mold 10" in a separation wall forming method when the separation wall transfer mold 10" does not have the spew preventing concave section, and FIG. 3 is a plan view showing the resultant substrate 1.

Electrodes 2 are formed on the substrate 1 and glass paste 3 is applied in a separation wall forming region A of the substrate 1. The separation wall transfer mold 10" has a concave section with concaves 11-i (i=1, 2, . . . , n) for the separation walls in a region corresponding to the separation wall forming region A. When the separation wall transfer mold 10" is pressed against the substrate 1, the glass paste 3 is spewed into the concaves 11-i of the concave section for the separation walls. At the same time, the glass paste 3 spews out around the separation wall forming region A. Because a region Y where the glass paste 3 is spewed out cannot be controlled, the region Y spreads irregularly as shown in FIG. 3. Therefore, the spewed glass paste reaches electrode ends, other parts and connection sections and causes a fault.

However, the separation wall transfer mold of the present invention has a spew preventing concave section. An excess portion of the glass paste is accumulated in the spew preventing concave section, and glass paste is prevented from being spewed out to the electrode ends, the other parts and the connection sections.

Figure 4:
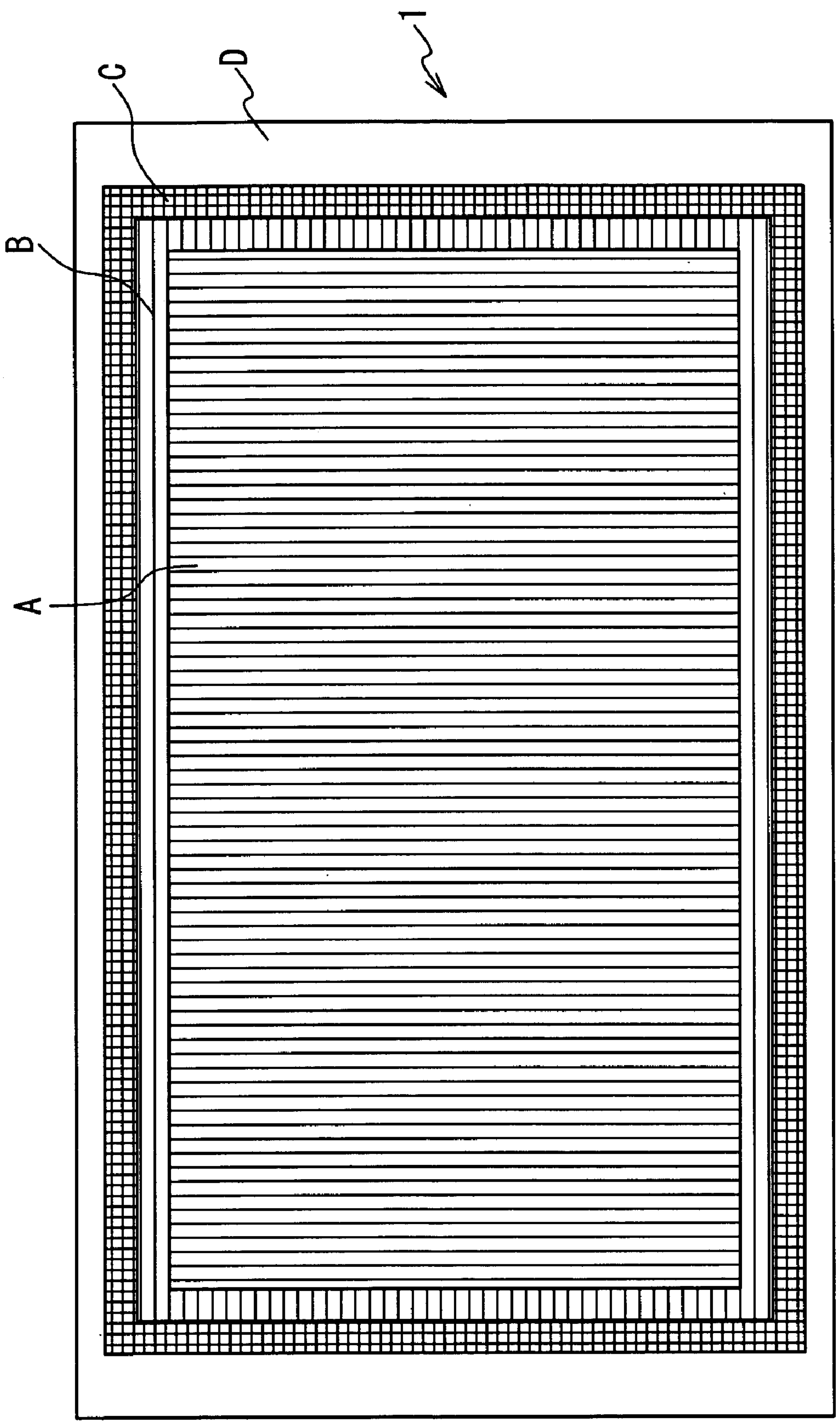
FIG. 4 is a plan view of a substrate when a separation wall transfer mold having a spew preventing concave section according to a first embodiment of the present invention is used to form separation walls.
Figure 5:
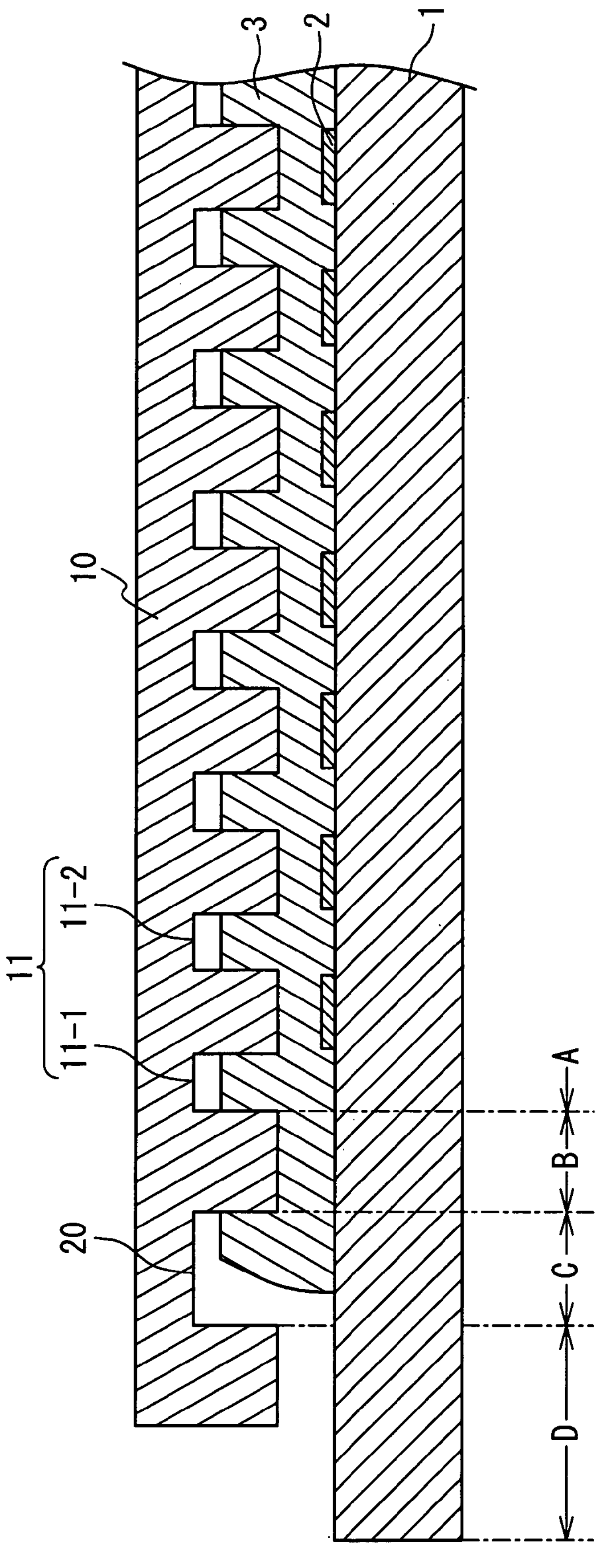
FIG. 5 is a cross sectional view showing a cross section of the substrate and the separation wall transfer mold in a process of forming the separation walls using the separation wall transfer mold of the first embodiment.

FIG. 4 is a plan view of a substrate 1 when a separation wall transfer mold 10 having the spew preventing concave section 20 is used to form separation walls, and FIG. 5 is a cross sectional view showing a cross section of the substrate 1 and the separation wall transfer mold 10 in a process of forming the separation walls using the separation wall transfer mold 10. As shown with FIG. 4, the substrate 1 is managed based on a separation wall forming region A, a link region B, a spew prevention region C, and a non-spew region D. The separation wall forming region A is provided in a center region of the substrate 1 and the separation walls are formed on the substrate 1 there. The link region B is provided around the separation wall forming region A to surround the separation wall forming region A and the excess portion of the glass paste 3 moves into the spew prevention region C, in this example. The spew prevention region C is provided around the link region B to surround the link region B and the excess portion of the glass paste 3 is accumulated. However, the spew prevention region C may be provided in a part of a region around the separation wall forming region A. In this case, the link region B is sufficient to be provided between the separation wall forming region A and the spew prevention region C. The non-spew region D is provided around the spew prevention region C and the glass paste 3 does not spew out.

Referring to FIG. 5, a concave section 11 with concaves 11-i (i=1, 2, . . . , n) for the separation walls is provided in a region of the separation wall transfer mold 10 corresponding to the separation wall forming region A. Also, the spew preventing concave section 20 is formed in a region of the separation wall transfer mold 10 corresponding to the spew prevention region C. When the separation wall transfer mold 10 is pressed against the substrate 1 on which glass paste 3 has been applied, the glass paste 3 is spewed into the concave section 11. The excess portion of the glass paste 3 moves through the link region B and is spewed out to the spew preventing concave section 20. A convex between the convex 11-1 of the concave section 11 and the spew preventing concave section 20 may be lower in height than that of a convex between concave 11-1 and another concave 11-2 in the concave section 11. In this case, the lower convexes may be formed in the whole or partially in the link region B.

Figure 6A:
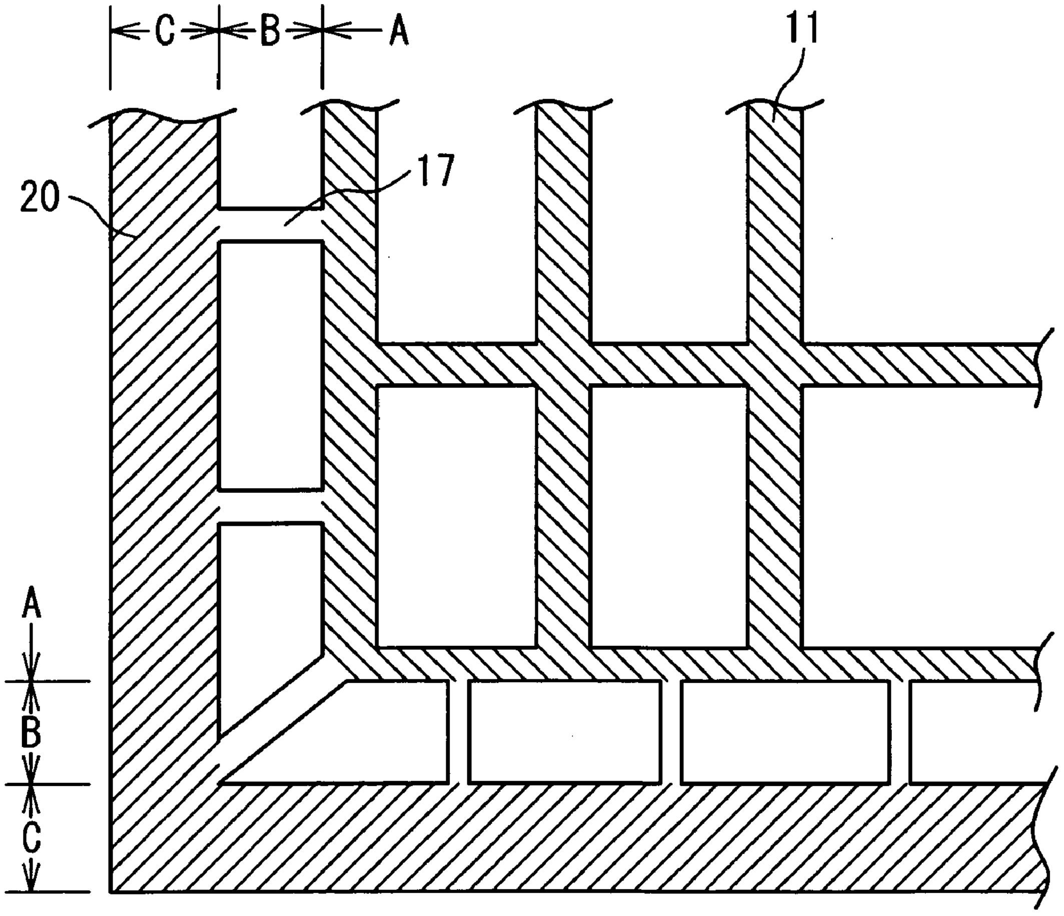
FIG. 6A is a plan view showing a portion of a separation wall transfer mold in which the spew preventing concave section and the concave section are formed.

FIG. 6A shows a portion of the separation wall transfer mold 10 in which the spew preventing concave section 20 and the concave section 11 are formed. Referring to FIG. 3A, the spew preventing concave section 20 and the concave section 11 are connected by slits 17 which are provided in the separation wall transfer mold 10 in a predetermined interval. In the separation wall transfer mold 10 shown in FIG. 3A, the concave 11-i (groove) of the concave section 11 and the slit 17 are not aligned on a line, because it is desirable that the excess portion of the glass paste 3 is spewed out into the spew preventing concave section 20 through the slit 17 after glass paste 3 is spewed into the concave section 11.

Figure 6B:
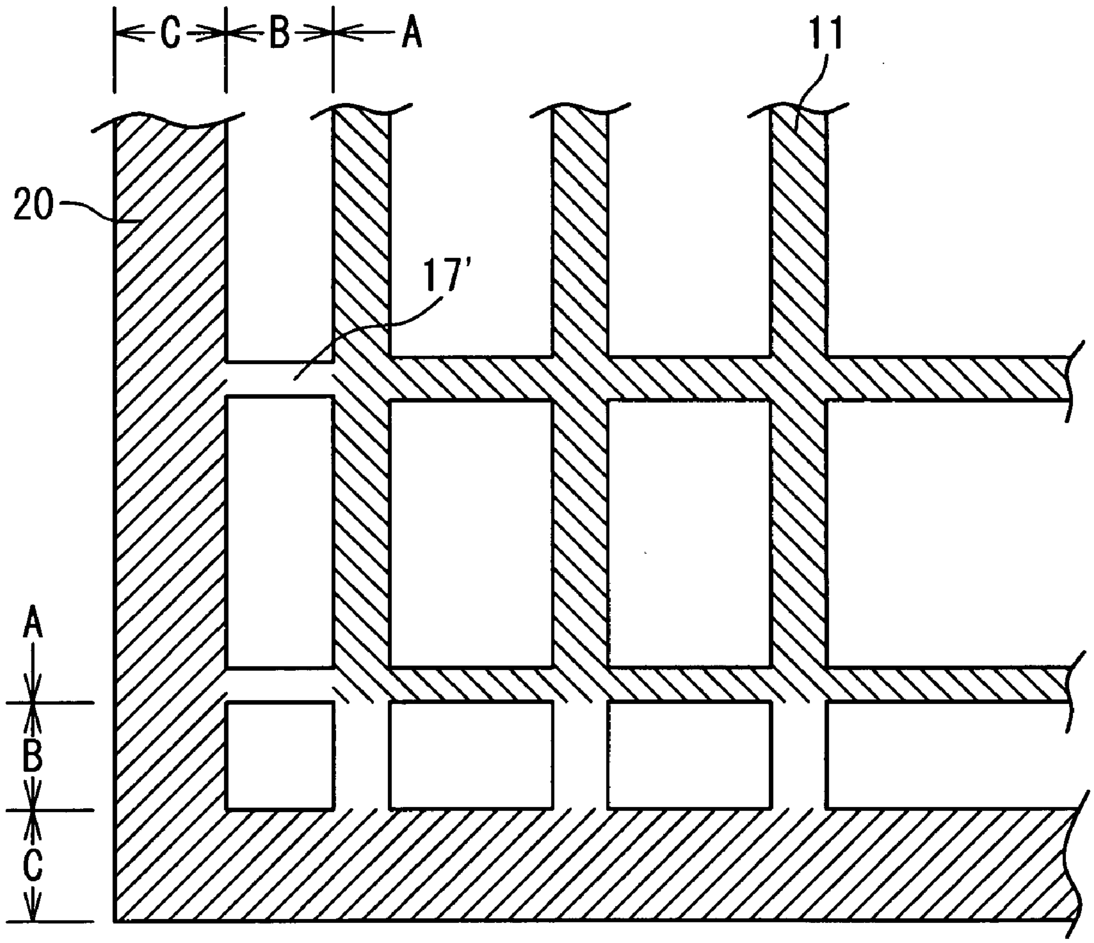
FIG. 6B is a plan view showing a portion of another separation wall transfer mold in which the spew preventing concave section and the concave section are formed.

Instead, as shown in FIG. 6B, the slit may extend in the direction of the concaves (grooves) to connect with the spew preventing concave section 20. The spew preventing concave section 20 may be provided to be orthogonal to the concaves (grooves) 11-i of the concave section 11 through the slits 17'. It is desirable that the slit 17 connects between the spew preventing concave sections 20 and the concave section 11 to have enough pressure loss such that the glass paste 3 sufficiently fills the concave section 11 for the separation walls.

Also, the separation wall transfer mold 10 may be provided without any slits 17 in the link region B such that the excess portion of the glass paste 3 transfers to spew preventing concave section 20 through a space between the substrate 1 and the separation wall transfer mold 10 in the link region B.

The height of the excess portion of the glass paste 3 formed in the spew preventing concave section 20 is desirably lower than that of the separation wall so that the excess portion of the glass paste 3 does not become an obstacle when the substrate 1 and another panel are combined. Therefore, the spew preventing concave section 20 is desirably formed to be shallower than the concave section 11.

Figure 7:
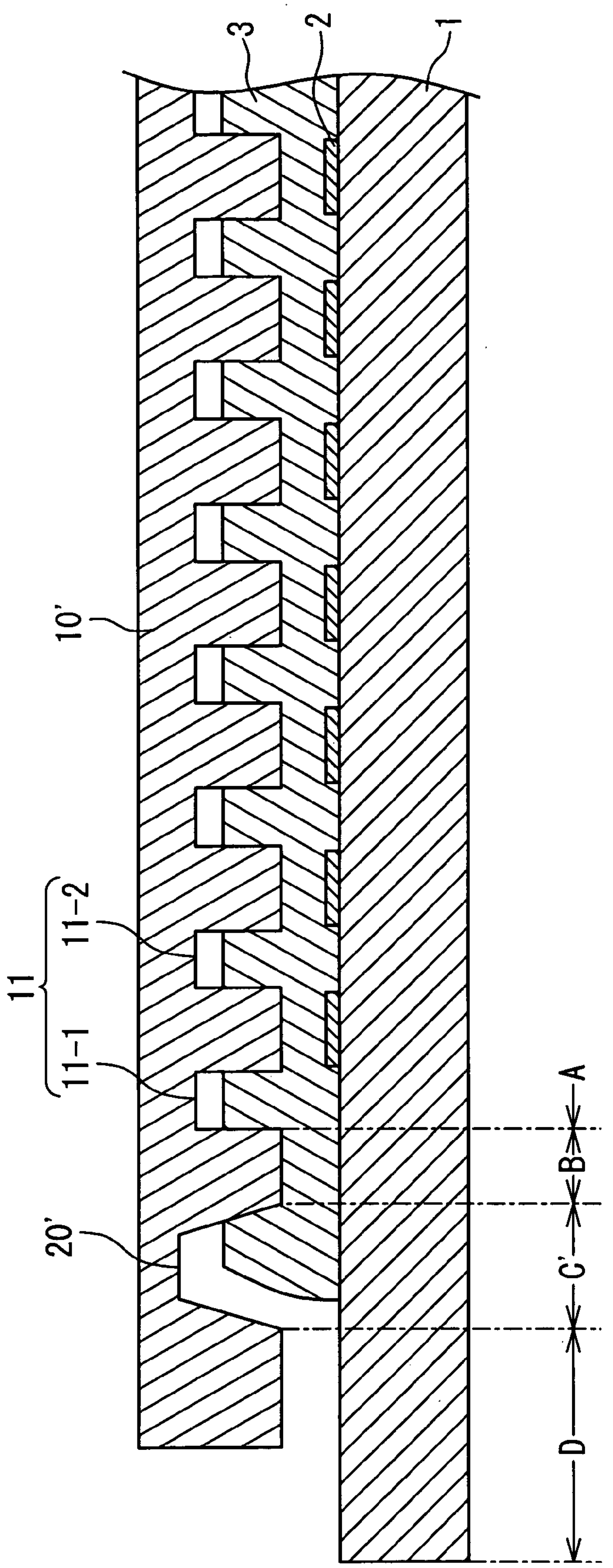
FIG. 7 is a cross sectional view showing a cross section of a substrate and the separation wall transfer mold according to a second embodiment of the present invention.

Referring to FIG. 7, the separation wall transfer mold 10' according to the second embodiment of the present invention will be described. The spew preventing concave section 20' of the separation wall transfer mold 10' has a cross section of a taper shape in which the width of the concave section becomes narrower gradually in the direction of the depth, i.e., an angle between the contact surface of the separation wall transfer mold 10' and the side wall of the spew preventing concave section 20' is obtuse.

Instead, the bottom surface of the concave section may be a curved surface. The excess portion of the glass paste 3 in the spew preventing concave section 20' is desirably formed in a shape not so as to become troublesome. Moreover, desirably, the spew preventing concave section 20' has such a shape that the glass paste 3 stably is spewed therein, and becomes a fixed shape easy to be filled. Therefore, it is desirable that the concave section 11 has the cross section having an obtuse corner angle and having the width narrower in to the depth direction.

Figure 8:
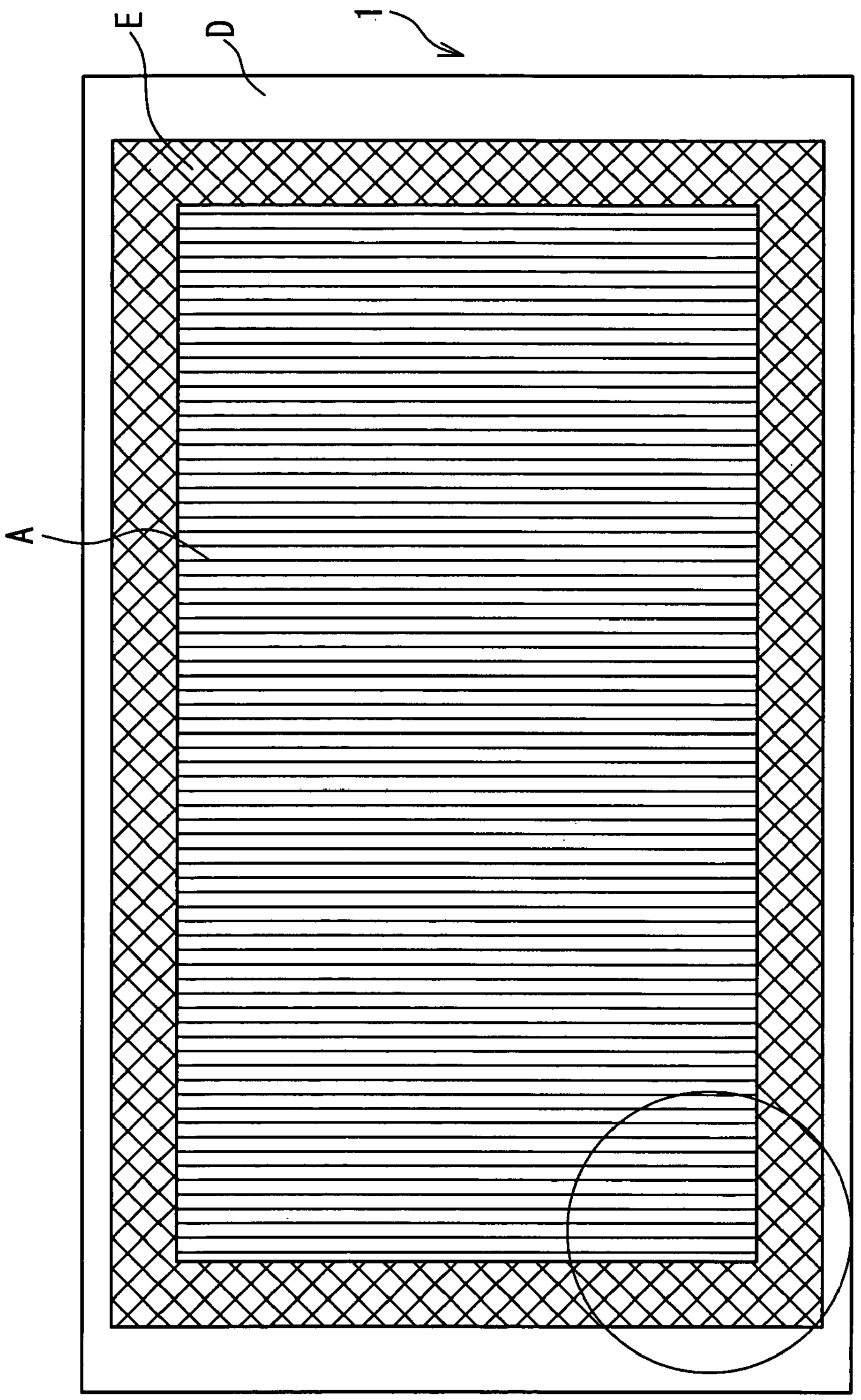
FIG. 8 is a plan view showing the separation wall formed on the substrate 1 by using the separation wall transfer mold of the second embodiment.

Next, FIG. 8 is a plan view showing the separation wall formed on the substrate 1 by using the separation wall transfer mold. Referring to FIG. 8, the separation wall transfer mold according to the third embodiment will be described. A separation wall forming region A, a spew prevention region E, a non-spew-out region D are formed on the substrate 1. In this example, the spew prevention region E has a same pattern as a pattern of the separation walls in the separation wall forming region A. That is, the separation wall transfer mold of this example has the concave section in the region corresponding to the separation wall forming region A and the spew preventing concave section in the region corresponding to the spew prevention region E. The spew preventing concave section has the same pattern as that of the concave section. The spew preventing concave section may have slits or a lattice pattern.

Figure 9:
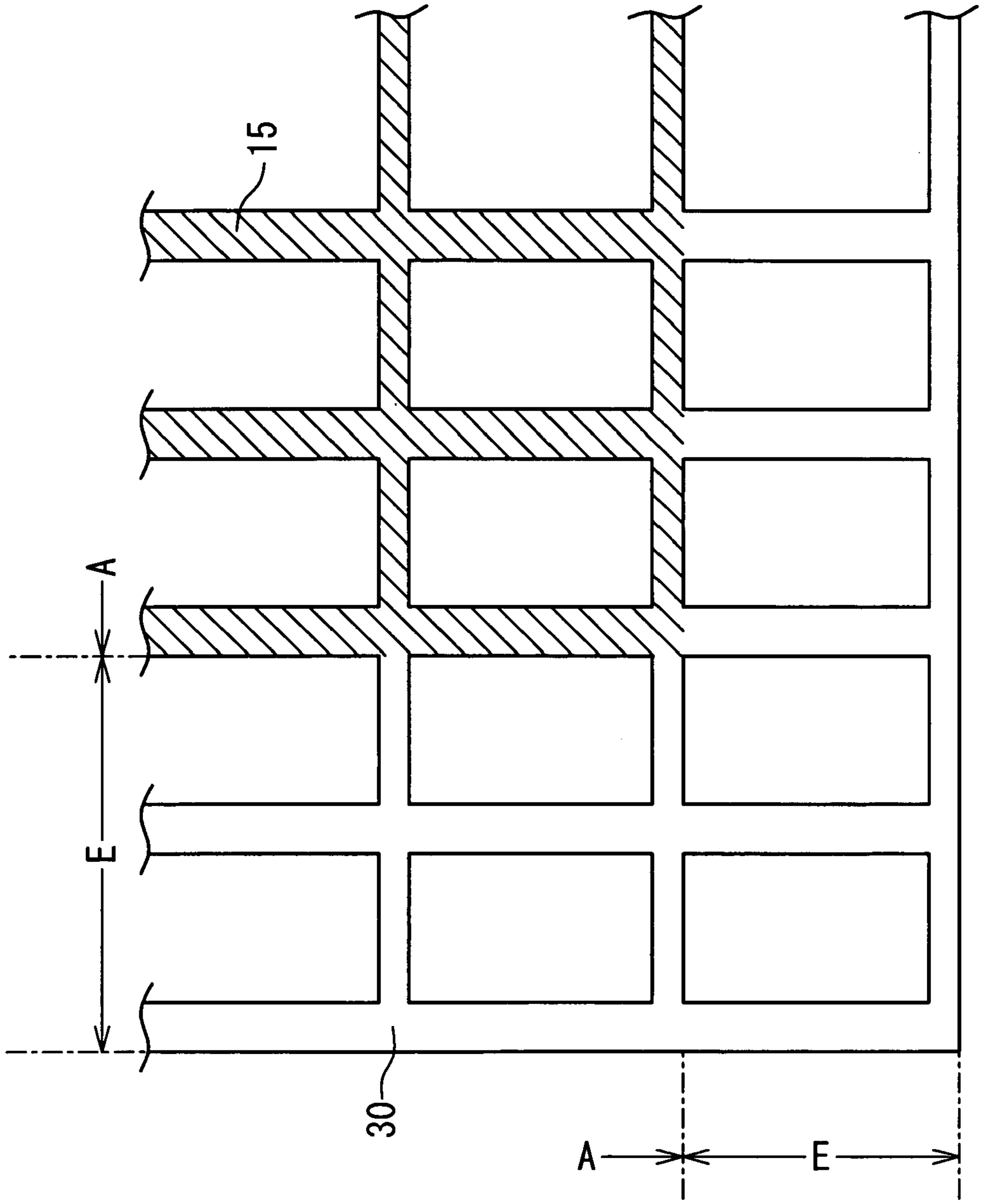
FIG. 9 is a expanded plan view showing a display separation wall forming region A and a spew prevention region E which are formed by using the separation wall transfer mold according to a third embodiment.

Moreover, FIG. 9 is a plan view showing the display separation wall forming region A and the spew prevention region E which are formed by using the separation wall transfer mold. FIG. 9 is an expanded plan view of a section a of FIG. 8. In this example, the separation walls 15 in a lattice form are formed in the separation wall forming region A. Also, an excess material accommodating section 30 is formed in the spew prevention region E from the glass paste spewed into the spew preventing concave section of the lattice form. That is, the spew preventing concave section is formed in a peripheral portion of the concave section corresponding to the separation wall forming region A. The separation wall 15 is formed of the glass paste 3 spewed sufficiently into the concave section to have the designed shape. Because the excess material accommodating section 30 is formed of the excess portion of the glass paste 3, the excess material accommodating section 30 is not necessary to be sufficiently filled and is sufficient if being within a range set for the spew preventing concave section. It should be noted that the pattern of the spew prevention region E is not always necessary to be the same as the pattern of the separation walls and the shape of the concave section is not limited to the same shape.

Next, a method of forming the separation walls 15 by using the separation wall transfer mold will be described. Here, an example of the method of forming the separation walls by using the separation wall transfer mold 10' in the second embodiment 2 will be described. It should be noted that the method of forming the separation walls 15 is similar even if the separation wall transfer molds in the other embodiments are used.

Figure 10A:
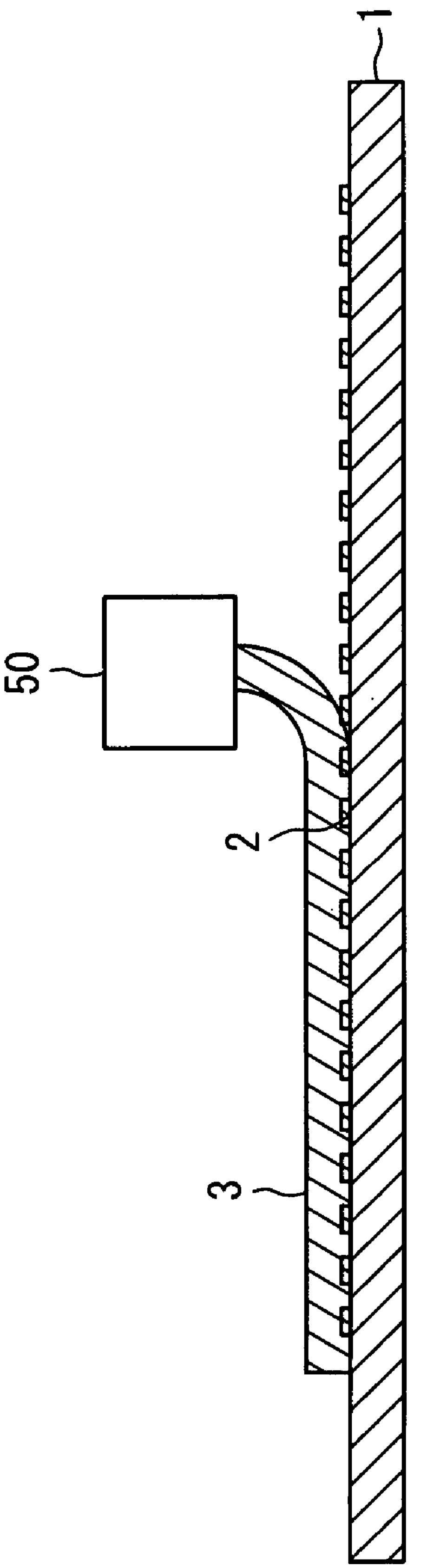
FIGS. 10A to 10D are cross sectional views of the substrate in a separation wall forming process.
Figure 10B:
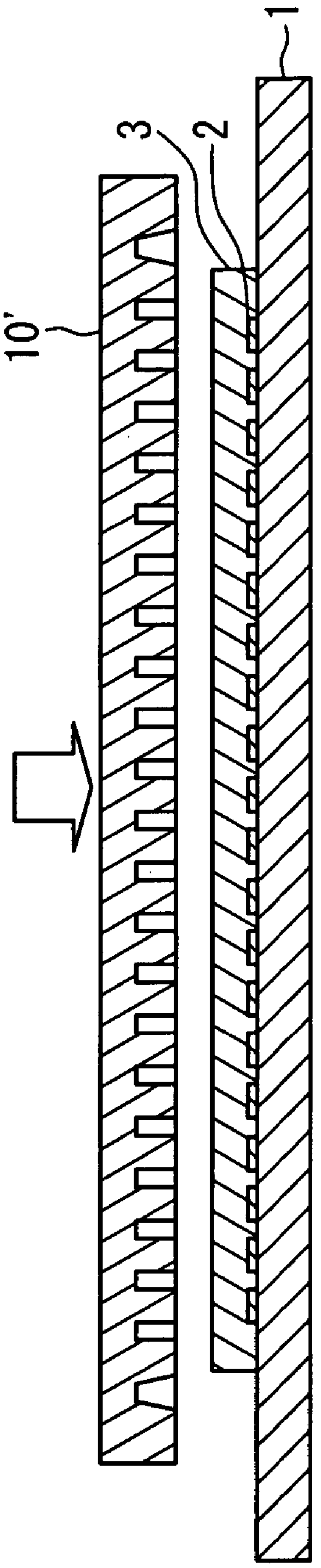
Figure 10C:
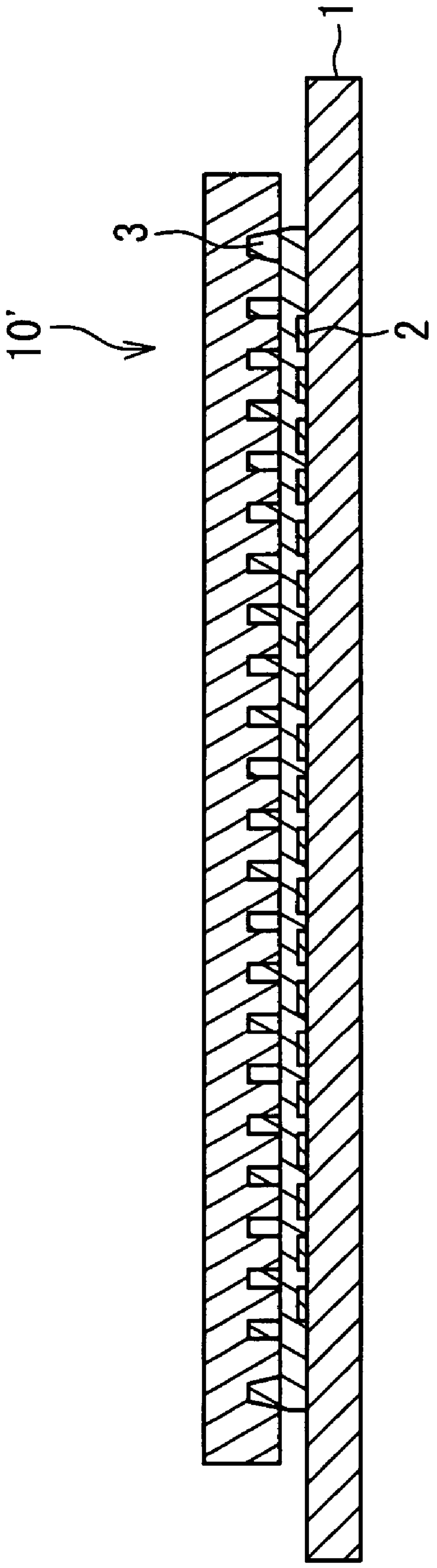
Figure 10D:
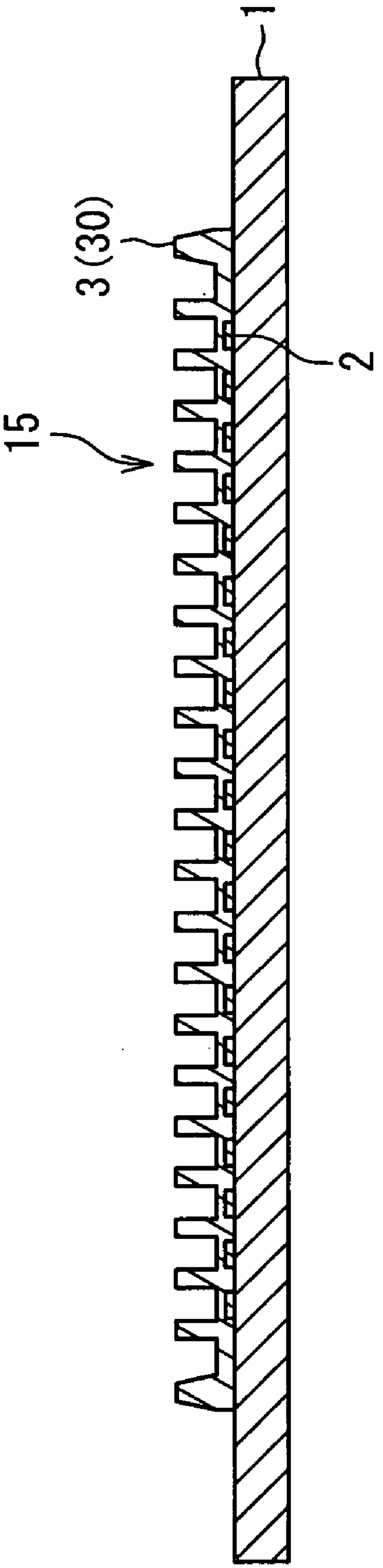

As shown in FIG. 10A, the glass paste 3 is applied on the substrate 1 on which the electrodes 2 have been formed. An enough amount of glass paste 3 is applied in a predetermined region by using a separation wall paste applying unit 50. Next, as shown in FIG. 10B, the separation wall transfer mold 10' is set in a predetermined position on the substrate 1 on which the glass paste 3 has been applied. Subsequently, as shown in FIG. 10C, the separation wall transfer mold 10' is pressed to the substrate 1 such that the glass paste 3 is sufficiently spewed into the concave sections 11. The excess portion of the glass paste 3 is spewed into the spew preventing concave section 20'. Next, as shown in FIG. 10D, the separation wall transfer mold 10' is removed from the substrate 1. As a result, the separation walls 15 are formed of the glass paste 3 and the excess material accommodating section 30 is formed of the excess portion of the glass paste 3. Then, the separation walls 15 and the excess material accommodating section 30 are sintered.

Figure 11A:
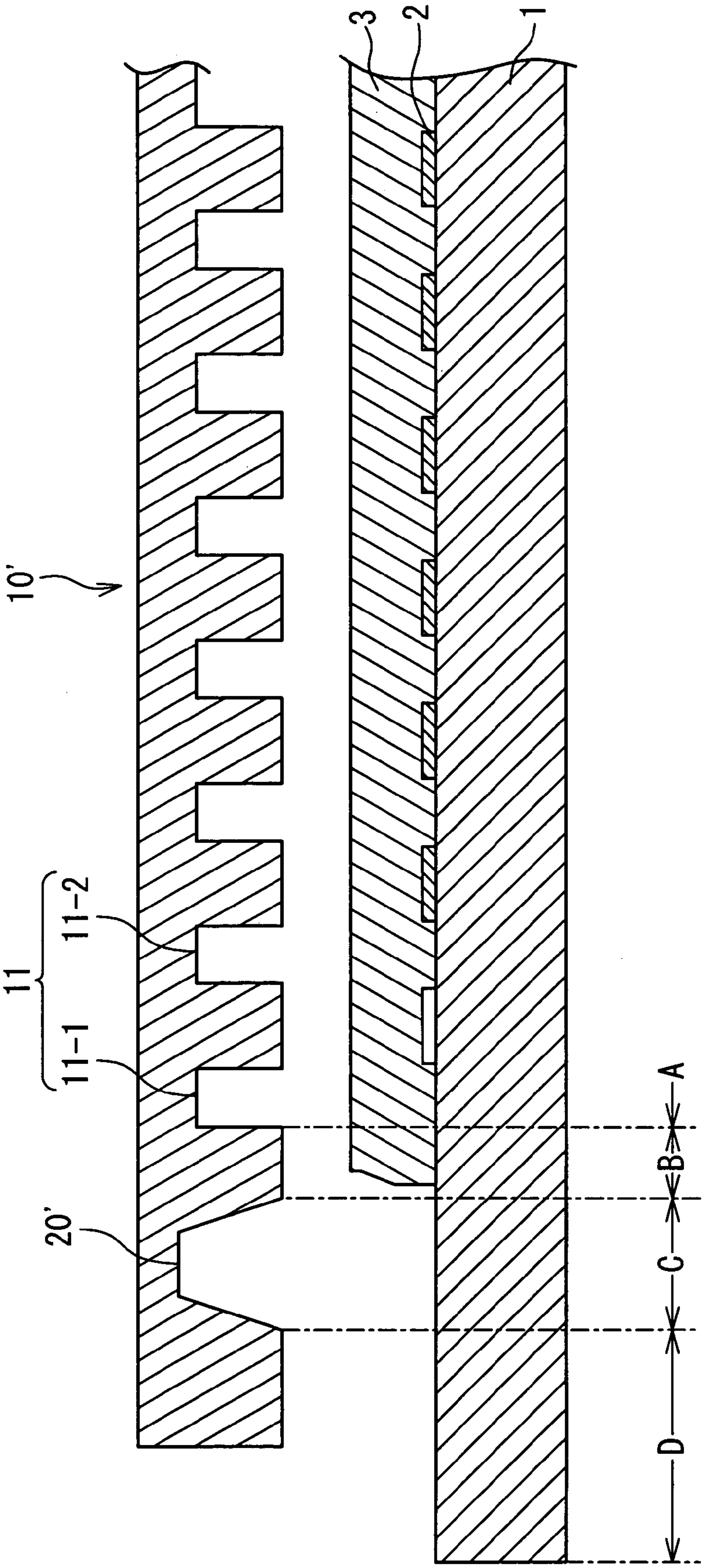
FIGS. 11A to 11D are cross sectional views of the substrate in a separation wall forming process.

FIGS. 11A to 11D show the end portion of the substrate 1. FIG. 11A shows a state that the separation wall transfer mold 10' is set above the substrate 1 on which glass paste 3 has been applied. The concave section 11 and the spew preventing concave section 20' are formed in a surface of the separation wall transfer mold 10' contacting the substrate 1.

Figure 11B:
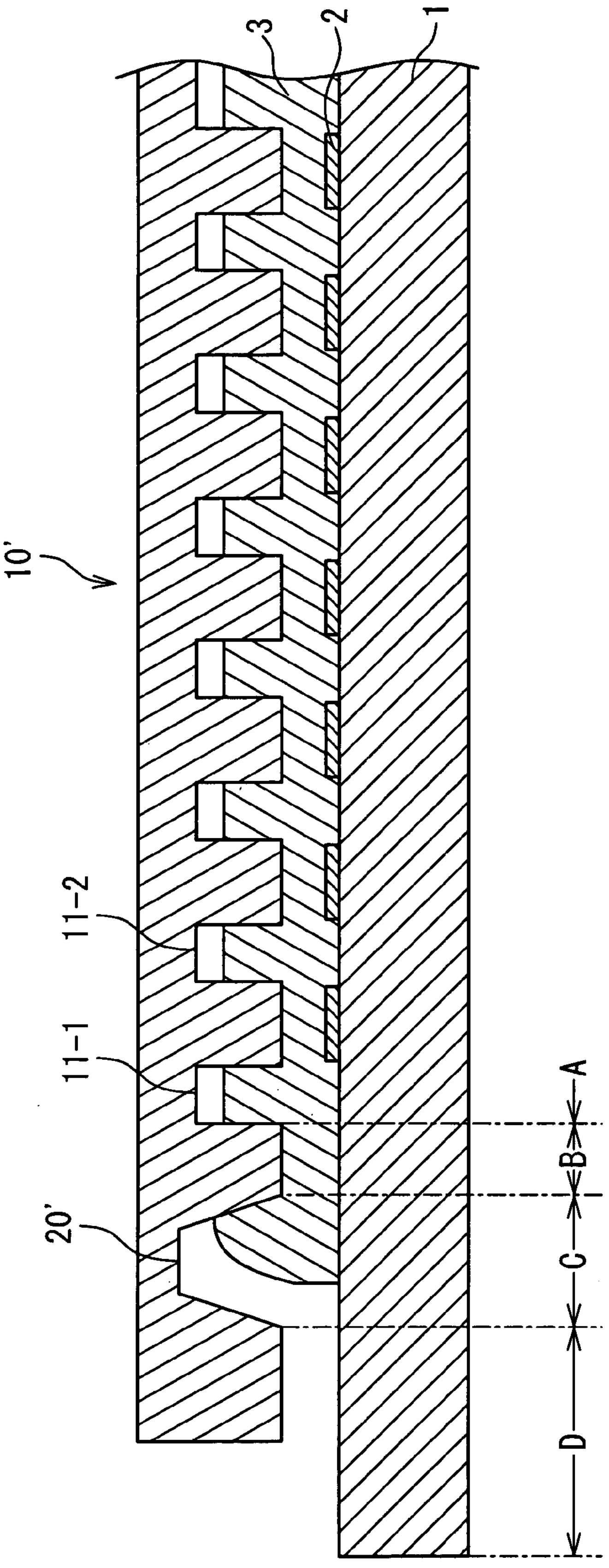
Figure 11C:
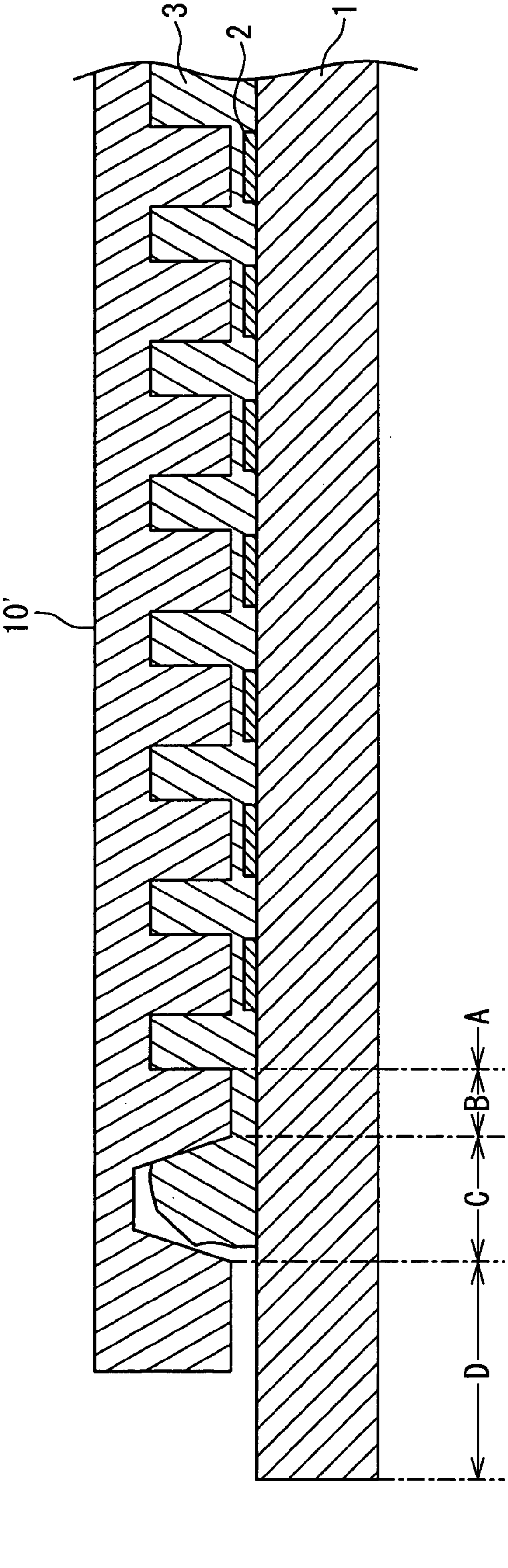
Figure 11D:
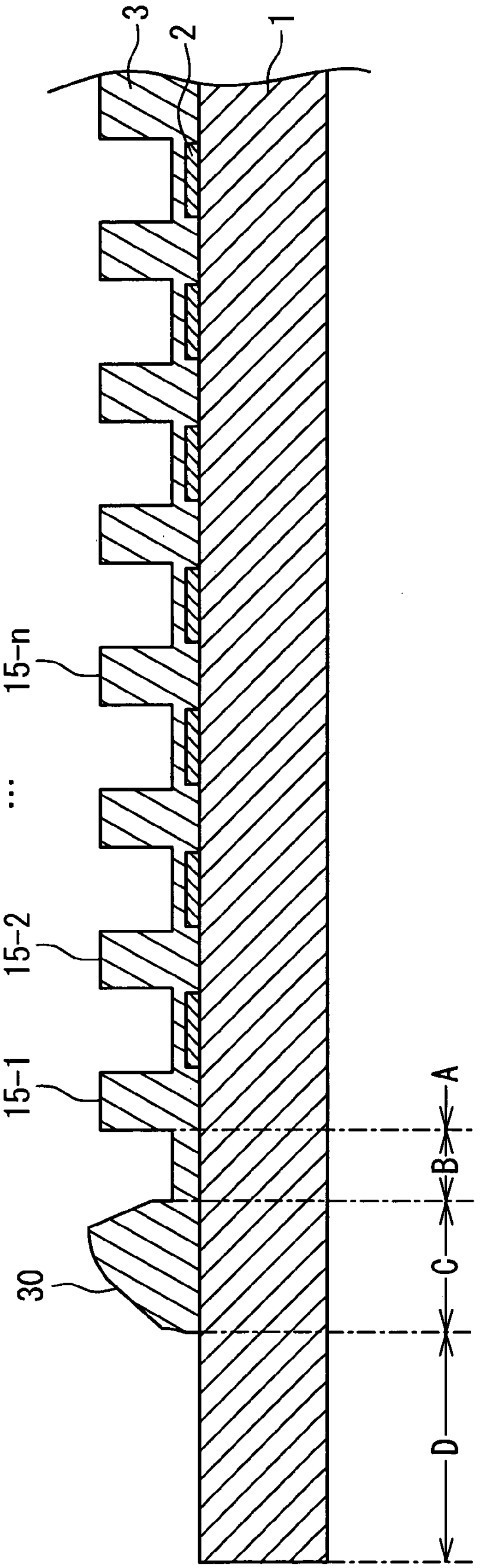

FIG. 11B is a diagram showing a process of pressing the separation wall transfer mold 10' to the substrate 1. When the separation wall transfer mold 10' is being pressed to the substrate 1, the concave section 11 starts to be filled with the glass paste 3. The excess portion of the glass paste 3 is spewed into the spew preventing concave section 20'.

FIG. 8C is a diagram showing the separation wall transfer mold 10' fully pressed against the substrate. When the separation wall transfer mold 10' fully pressed against the substrate, the concave section 11 is fully filled with the glass paste 3. Moreover, the excess portion of the glass paste 3 is held or accommodated in the spew preventing concave section 20'

FIG. 8D shows the substrate 1 from which the separation wall transfer mold 10' is removed. The excess material accommodating section 30 formed by he spew preventing concave section 20' and the separation walls 15 formed by the concave section 11-n are left on the substrate 1. Then, the separation walls 15 and the excess material accommodating section 30 are sintered.

As described above, by using the separation wall transfer mold having the spew preventing concave section, it is possible to prevent the glass paste from spewing out to an undesired region. Also, it is not necessary to remove the glass paste spewed out and a problem of dust is not caused. Therefore, the number of processes is reduced and the reliability of the product is improved.

According to the separation wall transfer mold of the present invention, it is possible to prevent the paste-shape material of the separation wall from spewing out when the paste-shape material is applied on the substrate and the separation wall transfer mold is pressed to the substrate.

What is claimed is:

1. A separation wall transfer mold adaptive to form separation walls on a substrate, comprising:
- a main body;
- a separation wall concave section having concaves for separation walls and formed in a surface of said main body for a material of said separation walls to be spewed into said separation wall concave section when said separation wall transfer mold is pressed to a substrate; and
- a spew preventing concave section formed in the surface of said main body for an excess portion of said material to be spewed in said spew preventing concave section.

2. The separation wall transfer mold according to claim 1, wherein said spew preventing concave section is provided in a peripheral portion of said separation wall concave section.

3. The separation wall transfer mold according to claim 1, wherein said spew preventing concave section is provided around said separation wall concave section to surround said separation wall concave section.

4. The separation wall transfer mold according to claim 1, wherein said spew preventing concave section is provided partially around said separation wall concave section.

5. The separation wall transfer mold according to claim 1, wherein said spew preventing concave section has a cross section in which a width of said spew preventing concave section becomes narrower in a depth direction of said spew preventing concave section.

6. The separation wall transfer mold according to claim 1, wherein said spew preventing concave section has a same pattern as said separation wall concave section.

7. The separation wall transfer mold according to claim 1, wherein a depth of said spew preventing concave section is shallower than that of said separation wall concave section.

8. The separation wall transfer mold according to claim 1, wherein said material is glass paste.

9. A method of forming separation walls in a plasma display panel, comprising:
- applying paste material on a substrate;
- pressing a separation wall transfer mold to said substrate, such that said paste material is spewed into a separation wall concave section of said separation wall transfer mold and an excess portion of said paste material is spewed in a spew preventing concave section of said separation wall transfer mold;
- removing said separation wall transfer mold from said substrate; and
- sintering said paste material.

10. A separation wall transfer mold adaptive to form separation walls on a substrate, comprising:

a main body;

a separation wall concave region in which first concaves for separation walls are formed on a side of a surface of said main body;

a spew preventing concave section region in which second concaves are formed on the side of the surface of said main body; and a link region through which said separation wall concave region and said spew preventing concave section are connected, wherein when said separation wall transfer mold is pressed to a substrate, an excess portion of a material for said separation walls is spewed from said separation wall concave section for said material to said spew preventing concave section through said link region.

11. The separation wall transfer mold according to claim 10, wherein said spew preventing concave section is formed such that said material accommodated in said separation wall concave section does not hinder assembly of said substrate.

12. The separation wall transfer mold according to claim 10, wherein said spew preventing concave section is provided partially or fully around said separation wall concave section.

13. The separation wall transfer mold according to claim 10, wherein a discharge space is formed from said separation walls, and a convex portion in said link region is recessed than a convex portion corresponding to said discharge space in said separation wall concave region.

14. The separation wall transfer mold according to claim 10, wherein said material is glass paste.

15. A method of forming separation walls in a plasma display panel, comprising:

applying paste material on a substrate;

pressing a separation wall transfer mold to said substrate, such that said paste material is spewed into a separation wall concave region and an excess portion of said paste material is spewed in a spew preventing concave region through a link region, said separation wall transfer mold comprising a main body, a separation wall concave region in which first concaves for separation walls are formed on a side of a surface of said main body, a spew preventing concave section region in which second concaves are formed on the side of the surface of said main body, and a link region through which said separation wall concave region and said spew preventing concave section are connected;

removing said separation wall transfer mold from said substrate; and sintering said paste material.

* * * * *